(12) United States Patent
Miller et al.

(10) Patent No.: US 6,365,271 B1
(45) Date of Patent: Apr. 2, 2002

(54) ANTIBLOCK COATING FOR HOT MELT ADHESIVES

(75) Inventors: Richard Anthony Miller; Rickey Thompson, both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/071,569

(22) Filed: May 1, 1998

Related U.S. Application Data

(60) Provisional application No. 60/045,356, filed on May 2, 1997.

(51) Int. Cl.⁷ ............................. B32B 7/12; B32B 33/00
(52) U.S. Cl. ............................. 428/346; 428/355 EN; 428/355 AC; 428/355 R; 428/480
(58) Field of Search .................. 428/355 EN, 355 AC, 428/346, 355 R, 480

(56) References Cited

U.S. PATENT DOCUMENTS

| | | |
|---|---|---|
| 3,734,874 A | 5/1973 | Kibler et al. |
| 3,779,993 A | 12/1973 | Kibler et al. |
| 4,052,368 A * | 10/1977 | Larson ..................... 260/75 S |
| 4,233,196 A | 11/1980 | Sublett |
| 4,304,901 A | 12/1981 | O Neill et al. |
| 4,335,220 A | 6/1982 | Coney |
| 4,503,180 A | 3/1985 | Ching |
| 5,026,756 A | 6/1991 | Arendt |
| 5,218,042 A | 6/1993 | Kuo et al. |
| 5,427,835 A * | 6/1995 | Morrison et al. ............. 428/96 |
| 5,543,488 A | 8/1996 | Miller et al. |
| 5,552,495 A | 9/1996 | Miller et al. |
| 5,624,986 A | 4/1997 | Bunnelle et al. |

FOREIGN PATENT DOCUMENTS

| EP | 0 115 307 | 8/1984 |
|---|---|---|

OTHER PUBLICATIONS

Arendt, William D., CHDM dibenzoate as a modifier for powder coatings, (1993), Proc. Water–Borne, Higher–Solids, Powder Coat. Symp., 20$^{th}$, pp. 508–524 (abstract only).

* cited by examiner

Primary Examiner—Daniel Zirker
(74) Attorney, Agent, or Firm—Betty J. Boshears, Esq.; Bernard J. Graves, Jr., Esq.

(57) ABSTRACT

The present invention is directed to an antiblock coating comprised of a composition that contains a dibenzoate ester moiety. The dibenzoate ester compounds, particularly 1,4-CHDM dibenzoate, provide an excellent non-stick coating to hot melt adhesives, thus providing for easier packaging, storage, and processing. In addition, such a coating facilitates recycling of materials to which the hot melt adhesive is.

6 Claims, No Drawings

ANTIBLOCK COATING FOR HOT MELT ADHESIVES

CROSS-REFERENCE TO RELATED APPLICATION

This application claims priority under 35 U.S.C. §119(e) to U.S. Provisional Application Ser. No. 60/045,356, filed May 2, 1997.

FIELD OF THE INVENTION

The present invention concerns a material that is useful for coating substrates such as adhesives. More particularly, the invention is directed to an antiblock coating for polymeric hot melt adhesives, and is especially useful for preventing blocking of hot melt adhesives when shipped in the form of particulates.

BACKGROUND OF THE INVENTION

Hot melt adhesives are useful for bonding together various substrates such as wood, paper, plastics, textiles, and other materials. Hot melt adhesives are prepared and shipped in many configurations depending upon the end use for the adhesive. For example, hot melt adhesives can be prepared and shipped in the shape of films, rods, and particulates. Packaging and shipping conditions for hot melt adhesives are important due to stability and shelf life concerns with the polymers, and the potential for blocking or agglomeration of the adhesive materials during shipping or storage. It is especially important to prevent blocking of particulate hot melt adhesives during shipping, because the particles must flow freely in order to be incorporated into a mixing vessel for final hot melt compounding. Hot melt adhesives that are particularly prone to blocking include the water dispersible polyesters described in U.S. Pat. Nos. 5,543,488, 5,552,495, 5,571,876, and 5,605,764.

In light of the above it would be very desirable to produce a hot melt adhesive with a non-tacky coating that maintains the desirable properties of presently available hot melt adhesives.

SUMMARY OF THE INVENTION

The applicants have unexpectedly discovered that dibenzoate esters, and compounds that contain dibenzoate ester moieties (hereinafter "dibenzoate ester compounds"), provide an improved antiblock coating that prevents adhesive materials from blocking to other adhesive materials. Thus, in one aspect the invention provides a coated substrate comprising a coating and a substrate, wherein the coating comprises a dibenzoate ester compound. In another aspect the invention provides a process of coating an adhesive material comprising contacting the adhesive material with a dibenzoate ester compound. In still another aspect the invention provides a process of providing anti-block properties to a particulate adhesive composition comprising contacting adhesive particles with an antiblocking effective amount of a dibenzo ate ester compound. The coated substrate has excellent hot melt adhesive properties. In a preferred embodiment, wherein the dibenzoate ester coats a water-dispersible adhesive material, the antiblock coating is also water-dispersible, thereby providing a coated substrate that is totally recyclable. The composition can be completely repulpable and readily removed from the wood or paper fibers used in disposable products.

Additional advantages of the invention will be set forth in part in the following discussion, and in part will be obvious from the discussion, or may be learned by practice of the invention. The advantages of the invention will be realized and attained by means of the elements and combinations particularly pointed out in the appended claims. It is to be understood that both the foregoing general description and the following detailed discussion are exemplary and explanatory only and are not restrictive of the invention, as claimed.

DISCUSSION

The present invention may be understood more readily by reference to the following detailed description of embodiments of the invention and the Examples included therein. However, before the present compounds, compositions and methods are disclosed and described, it is to be understood that this invention is not limited to specific synthetic methods, or to specific materials or formulations, as such may, of course, vary. It is also to be understood that the terminology used herein is for the purpose of describing particular embodiments only and is not intended to be limiting.

Furthermore, it must be noted that, as used in the specification and the appended claims, the singular forms "a," "an" and "the" include plural referents unless the context clearly dictates otherwise. Thus, for example, reference to "an aromatic compound" includes mixtures of aromatic compounds.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," the particular value forms another embodiment.

In this specification and in the claims which follow, reference will be made to a number of terms which shall be defined to have the following meanings:

Parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

The term "modified" is often used herein to describe polymers and means that a particular monomeric unit that would typically make up the pure polymer has been replaced by another monomeric unit that shares a common polymerization capacity with the replaced monomeric unit. Thus, for example, it is possible to substitute diol residues for glycol in poly(ethylene glycol), in which case the poly(ethylene glycol) will be "modified" with the diol. If the poly(ethylene glycol) is modified with a mole percentage of the diol, then such a mole percentage is based upon the total number of moles of glycol that would be present in the pure polymer but for the modification. Thus, in a poly(ethylene glycol) that has been modified by 50 mole % with a diol, the diol and glycol residues are present in equimolar amounts.

The term "polyester" includes copolyesters.

The term "dibenzoate ester compound" includes compounds that contain one or more dibenzoate ester moieties.

In one aspect the invention provides a coated substrate comprising a coating and a substrate, wherein the coating comprises a dibenzoate ester compound. In another aspect the invention provides a process of coating an adhesive material comprising contacting the adhesive material with a dibenzoate ester compound. In still another aspect the invention provides a process of providing anti-block properties to a particulate adhesive composition comprising contacting adhesive particles with an antiblocking effective amount of a dibenzoate ester compound.

Preferred dibenzoate ester compounds are solid at room temperature, and preferably have a glass transition temperature of greater than 23° C., more preferably have a glass transition temperature of greater than 45° C., even more preferably have a glass transition temperature above 600° C., and still even more preferably have a glass transition temperature above 80° C. In any event the glass transition temperature preferably does not exceed 200° C., and even more preferably does not exceed 120° C. In another embodiment the dibenzoate ester compound has a ring ball softening point (as measured by ASTM E-28) of from about 80 to about 140° C., and more preferably from about 105 to about 120° C.

In many embodiments the coated substrate of this invention is substantially dispersible or soluble in water, and thus facilitates recycling of materials to which the coated substrate my be applied. In a preferred embodiment 0.5 grams or greater (preferably 1.0 grams or greater) of the coated substrate are dispersible or soluble in 100 ml. of water that has a neutral pH at room temperature. In certain embodiments, however, the quantities that are preferably and more preferably dissolved are completely soluble or dispersible in 100 ml. of water only at temperatures above 400° C., or only at temperatures above 600° C., or only under alkaline conditions.

A surprising aspect of many embodiments of the present invention is the interaction between the dibenzoate ester compound and substrates of this invention, and the resulting solubility or dispersibility of the coated substrate. In many embodiments, for example, the dibenzoate ester compound, by itself, is essentially insoluble or nondispersible under conditions at which the coated substrate is substantially soluble or dispersible. These surprising results are often obtained when the substrate and coating each comprise the same dibenzoate ester moiety.

A particularly preferred dibenzoate ester compound is 1,3- or 1,4-cyclohexanedimethanol dibenzoate, and even more preferably 1,4-cyclohexanedimethanol dibenzoate. An example of such a product is Benzoflex 352 from Velsicol Chemical Corporation. However, other dibenzoate ester compounds could be used in the practice of the present invention.

Another preferred dibenzoate ester compound is selected from the class of linear polyesters that contain residues of 1,3- or 1,4- cyclohexanedimethanol (preferably 1,4-) and terephthalic or isophthalic acid (preferably isophthalic). A particularly preferred polyester contains diacid monomer residues that are about 75 to 90 mol percent isophthalic acid residues, and about 10 to 25 mol percent 5-sodiosulfoisophthalic acid monomer residues; and diol monomer residues of greater than about 45 mol percent diethylene glycol monomer residues and less than 55 mol percent 1,4-cyclohexanedimethanol residues.

The dibenzoate ester compound is coated onto the substrate, preferably at low addition levels, by methods known in the art, such as dip coating, high-speed coaters, or spray coating. In a preferred embodiment, a molten dibenzoate ester compound is brought to a temperature of 177° C. and small particles of the substrate are dip coated in the molten plasticizer. The particles are preferably coated with about 0.5 to about 5.0 weight percent of the dibenzoate ester compound, and more preferably from about 0.9 to about 1.3 weight percent, based on the weight of the coated particle.

In one embodiment the substrate is a hot melt adhesive composition that preferably is water dispersible. The substrate is typically a polyester, polyamide, or polyesteramide, and preferably has a glass transition temperature from about 0 to about 90° C. Branched sulfopolyesters, and particularly the branched sulfopolyesters of (II) below, are especially preferred compositions for the substrate of this invention.

In another embodiment the substrate is a blend of two polyesters, each of which may be linear or branched, although preferably the blend is a mixture of linear and branched polyesters. In another preferred embodiment, the coated composition contains about 20 to 80 weight percent of linear water-dispersible polyester of (I) and about 20 to 80 weight percent of branched water-dispersible polyester of (II), where (I) and (II) are as set forth below.

The linear water-dispersible polyester of (I) is made of the residues or moieties of the following reaction products:
(i) at least one difunctional dicarboxylic acid which is not a sulfomonomer;
(ii) about 4 to 25 mol percent, based on the total of all acid, hydroxyl and amino equivalence, of residues of at least one difunctional sulfomonomer containing at least one sulfonate group bonded to an aromatic ring wherein the functional groups are hydroxyl, carboxyl, or amino;
(iii) at least one diol or a mixture of a diol and a diamine comprising:
(a) at least 15 mol percent, based on the total mol percent of diol moieties or diol and diamine moieties, of a diol or diamine having the formula H(—OCH$_2$CH$_2$—)$_n$OH and HRN—(O—

$CH_2CH_2$—0)$_n$—NHR, wherein n is 2 to about 20 and R is hydrogen or $C_1$–$C_6$ alkyl, or (b) about 0.1 to less than about 15 mol percent, based on the total mol percent of diol moieties or diol and diamine moieties, of moieties of a poly(ethylene glycol) having the formula H(—$OCH_2CH_2$—). OH wherein n is 2 to about 500;

(iv) optionally, moieties of at least one difunctional monomer reactant selected from hydroxycarboxylic acids, aminocarboxylic acids and aminoalkanols; wherein the polymer contains substantially equal mol proportions of acid equivalents (100 mol %) and diol or diol and diamine equivalents (100 mol %) wherein at least 20 weight percent of the groups linking the moieties of the monomeric units are ester linkages and wherein the inherent viscosity is at least 0.1 dL/g measured in a 60/40 parts by weight solution of phenol/tetrachloroethane at 25° C. and at a concentration of about 0.25 g of polymer in 100 ml of the solvent. This linear water-dispersible polyester composition of (I) is described in detail in U.S. Pat. Nos. 3,734,874; 3,779, 993; 4,233,196; and 4,335,220, the disclosures of which are incorporated herein by reference in their entirety.

The sulfonate-containing, water-dispersible, linear polyesters of (I) comprise polyesters, including polyesteramides, having repeating, alternating residues or moieties of one or more dicarboxylic acids which is not a sulfomonomer and one or more diols or a combination of one or more diols and one or more diamines wherein the mol percentages are based on 100 mol percent dicarboxylic acid residues and 100 mol percent diol or diol and diamine residues, for a total of 200 mol percent. Alternatively, the polyesters can include residues of monomers having mixed functionality such as hydroxycarboxylic acids, aminocarboxylic acids and/or aminoalkanols.

The water-dispersible polyesters of (I) have an inherent viscosity of at least 0.1 dL/g, preferably about 0.28 to 0.45 dL/g, measured in a 60/40 parts by weight solution of phenol/tetrachloroethane at 25° C. and at a concentration of about 0.25 g of polymer in 100 ml of solvent. Examples of suitable difunctional dicarboxylic acid monomers used to make the residue of (i) include aliphatic dicarboxylic acids, alicyclic dicarboxylic acids, aromatic dicarboxylic acids, or mixtures of two or more of these acids. Examples of preferred suitable dicarboxylic acids include succinic; glutaric; adipic; azelaic; sebacic; fumaric; maleic; itaconic; 1,4-cyclohexanedicarboxylic; phthalic; terephthalic; and isophthalic. If terephthalic acid is used as the dicarboxylic acid component of the polyester, superior results are achieved when at least 5 mol percent of one of the other acids is also used. It should be understood that the use of the corresponding acid anhydrides, esters, and acid chlorides of these acids is included in the term "dicarboxylic acid".

The difunctional sulfo-monomer component of (ii) is preferably a dicarboxylic acid or ester thereof containing a metal sulfonate group or a glycol containing a metal sulfonate group or a hydroxy acid containing metal sulfonate group. The cation of the sulfonate salt can be $NH4^+$, or the metal ions $Li^+$, $Na^+$, $K^+$, $Mg^{++}$, $Ca^{++}$, $Cu^{++}$, $Ni^{++}$, $Fe^{++}$, $Fe^{+++}$, and the like. Residue or reactant (ii) in the polyester of the present invention is a difunctional monomer containing a —$SO_3M$ group attached to an aromatic nucleus, wherein M is hydrogen, $NH_4^+$, or a metal ion. The difunctional monomer component may be either a dicarboxylic acid or a diol adduct containing an —$SO_3M$ group. The cation of the sulfonate salt group can be $NH_4^+$, or the metal ions $Li^+$, $Na^+$, $K^+$, $Mg^{++}$, $Ca^{++}$, $Cu^{++}$, $Ni^{++}$, $Fe^{++}$, $Fe^{+++}$, and the like. Preferred are monovalent cations, such as $NH_4^+$ and the monovalent cations of lithium, sodium, and potassium, when stability in water is desired.

The —$SO_3M$ group is attached to an aromatic nucleus, examples of which include benzene, naphthalene, anthracene, diphenyl, oxydiphenyl, sulfonyldiphenyl, and methylenediphenyl. The nonmetallic portion of the nonmetallic sulfonate group optionally present in reactant (ii) is a nitrogen-based cation derived from nitrogen containing bases which may be aliphatic, cycloaliphatic or aromatic basic compounds that have ionization constants in water at 25 C. of $10^{-3}$ to $10^{-10}$, and more preferably $10^{-5}$ to $10^{-8}$. Especially preferred nitrogen-containing bases are ammonia, dimethylethanolamine, diethanolamine, triethanolamine, pyridine, morpholine, and piperidine. Such nitrogen-containing bases and cations derived therefrom are described in U.S. Pat. No. 4,304,901, the disclosure of which is incorporated herein by reference in its entirety. It is preferred that reactant (ii) is present in an amount of 4 to 25 mol percent, more preferably about 8 to 18 mol percent, with a mol percent of about 10 being most preferred.

Examples of suitable poly(ethylene glycols) of (iii) include relatively high molecular weight polyethylene glycols, some of which are available commercially under the designation "Carbowax", a product of Union Carbide. Poly (ethylene glycols) having molecular weights of from about 500 to about 5000 are especially suitable.

The remaining portion of the glycol component may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl- 1,3-propanediol; 2-ethyl-2-isobutyl- 1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the above glycols.

Advantageous examples of difunctional monomer component of (iii) which are diamines include ethylenediamine; hexamethylenediamine; 2,2,4-trimethylhexamethylenediamine; 4-oxaheptane-1,4-diamine, 4,7-dioxadecane-1,10-diamine; 1,4-cyclohexanebismethylamine; 1,3-cyclohexanebismethylamine; heptamethylenediamine; dodecamethylenediamine, etc.

Advantageous difunctional components which are aminoalcohols or aminoalkanols include aromatic, aliphatic, heterocyclic, and other types in regard to component (iv). Specific examples include 5-aminopentanol-1,4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —$CR_2$—OH group.

Advantageous difunctional monomer components which are aminocarboxylic acids include aromatic, aliphatic, heterocyclic, and other types in regard to component (iv) and include lactams. Specific examples include 6-aminocaproic acid, its lactam known as caprolactam, omega aminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)cyclohexanecarboxylic acid, etc. Generally, these compounds contain from 2 to 20 carbon atoms.

Preferred water-dispersible linear polyesters of (I) contain diacid monomer residues that are about 75 to 90 mol percent isophthalic acid residues, and about 10 to 25 mol percent 5-sodiosulfoisophthalic acid monomer residues; and diol monomer residues of about 45 to 100 mol percent diethylene glycol monomer residues and 0 up to 55 mol percent 1,4-cyclohexanedimethanol. The more preferred water-dispersible linear polyesters of (I) have a weight average molecular weight in the range of about 4,000 to 6,000 by gas-phase chromatography based on a polystyrene standard, and a Tg range of about 25 to 88° C., preferably about 29 to 55° C.

In a preferred embodiment, the branched water-dispersible polyester of (II) is made of the moieties of the reaction products:

(a) at least one difunctional dicarboxylic acid which is not a sulfomonomer;

(b) about one to 20 mol percent, based on the total of acid, hydroxyl and amino equivalents, of residues of at least one difunctional sulfomonomer containing at least one sulfonate group bonded to an aromatic ring wherein the functional groups are hydroxyl, carboxyl, or amino;

(c) at least one difunctional reactant selected from a glycol or a mixture of glycol and diamine having two —NRH groups, the glycol containing two —C(R$^1$)$_2$—OH groups wherein each R$^1$ in the reactant may be the same or different and is independently selected from hydrogen or an alkyl group of 1 to 6 carbon atoms;

(d) about 0 to 40 mol % of a difunctional reactant selected from hydroxycarboxylic acids having one —C(R—)$_2$—OH group, aminocarboxylic acids having one —HRH group, amino-alcohols having one —C(R—)$_2$—OH group and one —NRH group, or mixtures of said difunctional reactants wherein R in the reactant may be the same or different and is independently selected from hydrogen or an alkyl group of 1 to 6 carbon atoms; and (e) 1 to 40 mol % of a "multifunctional" or "branch-inducing" reactant containing at least three functional groups selected from hydroxyl, carboxyl, amino, and mixtures thereof;

wherein the polyester has a predispersion pH greater than 4 and all stated mol percents are based on the total of all acid, hydroxyl, and amino group containing reactants being equal to 200 mol percent, and wherein the polymer containing a portion of the acid group containing reactants (100 mol percent acid) to hydroxyl and amino-group containing reactants (100 mol %) such that the value of EQ (base) divided by EQ (acid) is between 1 and 1.6.

The branched water-dispersible polyesters of (II) are disclosed in detail in U.S. Pat. No. 5,218,042, the disclosure of which is incorporated herein by reference in its entirety. U.S. Pat. No. 5,218,042 is directed towards increasing the stability of dispersions in water and thus endcaps the acid groups or forms a diol adduct of a dicarboxylic sulfomonomer to maintain dispersion stability. However, the present invention is not necessarily directed towards maintaining a stable emulsion, but can be directed simply at producing an emulsion by pulping and dissolving the hot-melt adhesive in water until it is separated from the fibers. Therefore, endcapping and forming a diol adduct of the sulfomonomer is simply an alternative and not a requirement for the present invention.

The polyester of (II) is branched by virtue of the presence of a multifunctional reactant that contains at least three functional groups selected from hydroxyl, carboxyl, and amino. The difunctional dicarboxylic acid which is not a sulfomonomer of (a) can be the same or different as that in (i) and is generally selected from the same dicarboxylic acids as in (i) from the polyester of (I) above. The difunctional sulfomonomer of (b) can also be the same as the difunctional sulfomonomer used in (i) in the polyester of (I) above or selected from suitable difunctional sulfomonomers disclosed above.

It is preferred that reactant (c) is a glycol or mixture of glycols. The glycol component may consist of aliphatic, alicyclic, and aralkyl glycols. Examples of these glycols include ethylene glycol; propylene glycol; 1,3-propanediol; 2,4-dimethyl-2-ethyl-hexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Examples of other suitable glycols are poly(ethylene glycols) which include diethylene glycol, triethylene glycol, tetraethylene glycol, and pentaethylene, hexaethylene, heptaethylene, octaethylene, nonaethylene, and decaethylene glycols, and mixtures thereof. A preferred poly(ethylene glycol) employed in the polyester of the present invention is diethylene glycol or triethylene glycol or mixtures thereof Copolymers may be prepared from two or more of the above glycols. Preferred glycols include ethylene glycol; diethylene glycol; 2,2-dimethyl-1,3-propanediol; 2-ethyl-2-butyl-1,3-propanediol; 2,2,4-trimethyl-1,3-pentanediol; 1,4-cyclohexane-dimethanol; 1,3-cyclo-hexanedimethanol; hydroxypivalyl hydroxypivalate; dipropylene glycol; 1,6-hexanediol; 1,10-decanediol; 1,3-butanediol; hydrogenated bisphenol A; 1,4-butanediol; and the like.

Advantageous difunctional components which are aminoalcohols include aromatic, aliphatic, heterocyclic and other types as in regard to component (d). Specific examples include 5-aminopentanol-1,4-aminomethylcyclohexanemethanol, 5-amino-2-ethyl-pentanol-1, 2-(4-1-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —C(R)$_2$—OH group.

Advantageous difunctional monomer components which are aminocarboxylic acids include aromatic aliphatic, heterocyclic, and other types as in regard to component (d) and include lactams. Specific examples include 6-aminocaproic acid, its lactam known as caprolactam, omega-aminoundecanoic acid, 3-amino-2-dimethylpropionic acid, 4-(13-aminoethyl)-benzoic acid, 2-(13-aminopropoxy)benzoic acid, 4-aminomethylcyclohexanecarboxylic acid, 2-(B-aminopropoxy)cyclohexane-carboxylic acid, etc. Generally these compounds contain from 2 to 20 carbon atoms.

Advantageous examples of difunctional monomer component (d) which are diamines include ethylenediamine; hexamethylenediamine; 2,2,4-trimethylhexamethylenediamine; 4-oxaheptane-1,4-diamine; 4,7-dioxadecane-1,10-diamine; 1,4-cyclohexanebismethylamine; 1,3-cycloheptamethylenediamine; dodecamethylenediamine, etc.

Examples of preferred multifunctional reactants of (e) are trimethylpropane (TMP), trimethylolethane (TME), glycerine, pentaerythritol, erythritol, threitol, dipentaerythritol, sorbitol, trimellitic anhydride, pyromellitic dianhydride, and dimethylolpropionic acid with TMP being most preferred. In a preferred branched water-dispersible polyester of (II), the dicarboxylic acid of (a) is selected from isophthalic acid or adipic acid and mixtures thereof, the dicarboxylic acid sulfomonomer of (b) is 5-sodiosulfoisophthalic acid, the glycol component in (c) is neopentyl glycol, no (d) component is present, and the multifunctional reactant of (e) is TMP. It is further preferred that the mol percent of the sulfomonomer such as sodiosulfoisophthalic acid of (b) be present in a concentration of about 3 to 6 mol percent, more preferably about 3 to 4 mol percent based on the total mols of difunctional dicarboxylic acid monomers present. Preferred amounts of (e) are about 3 to 15 mol percent with about 7 to 8 mol percent (e) being most preferred.

To prepare water-dispersible hot melt adhesives of the present invention that contain both (I) and (II), the water-dispersible linear polyester composition of (I) can be blended with the branched water-dispersible polyester composition of (II) at temperatures greater than 200° C., preferably about 225° C., for at least two hours. The relative amounts of the two polyesters vary from about 20 to 80 weight percent of the polyester of (I) and about 20 to 80 weight percent of the polyester of (II). The concentration of these two polyesters in the hot melt adhesive composition according to this embodiment is preferably greater than 30 but less than 80 weight percent polyester of (I) and greater than 20 but less than 70 weight percent of the polyester of (II). The concentration of the two polyesters is more preferably about 40 to 77 weight percent (I) and about 23 to 60 weight percent of (II), even more preferably about 60 to 75 weight percent of (I) and about 25 to 40 weight percent of (II) with a concentration of the two polyesters in weight percent of about 70 (I) and about 30 (II) being most preferred.

Higher amounts of the polyester of (I) increase the melting point of the final adhesive composition. At amounts of the polyester of (I) higher that 80 weight percent, the adhesive has too high of a melting point to be practical. Higher amounts of the polyester of (II) decrease the melting point of the final adhesive. At amounts of the polyester of (II) higher that 80 weight percent, sometimes higher than 70, the adhesive has too low of a melting point to be practical.

The final hot melt adhesive composition substrates preferably have a weight average molecular weight of about 2,000 to 10,000, more preferably about 5,000 to 5,500 as determined by gas phase chromatography based on a polystyrene standard. The preferred Tg of the final adhesive composition according to the present invention varies from about 4 to 22° C., preferably about 4 to 8° C. The final hot melt adhesive composition according to the present invention preferably has a viscosity of about 1,500 to about 30,000 centipoise at 350° F. (175° C.), more preferably about 5,000 to 20,000 cP at 350° F. (175° C.).

The hot melt adhesive compositions according to the present invention are particularly useful due to their good combination of properties and are especially suitable for use as adhesives for paper products and wood pulp because in many embodiments they are easily recyclable and repulpable. The hot melt adhesives according to the present invention are recyclable/repulpable and improved over prior art repulpable hot melt adhesive compositions in that the set time, temperature sensitivity, compatibility, stability on storage, shear strength, tensile strength, viscosity, and cold flow resistance are improved.

The hot melt adhesives according to the present invention can also be used for adhesively bonding non-woven assemblies, such as adhesively bonding nonwoven materials to polyethylene or other polyolefin films. Indeed, the hot melt adhesives preferably can be applied to many materials, including polyamides, polyimides, and polyolefins. Most preferably such materials have an inherent viscosity from about 0.2 to about 1.0 and, in a separate embodiment, a melt temperature above about 60° C. In particular embodiments, the coated substrates of this invention are used as adhesives in feminine hygiene products, in diapers, and in cigarette filters.

The hot melt adhesive composition according to the present invention can also contain standard additives including stabilizers, preferably about 0.1 to about 0.5 weight percent stabilizers. Suitable stabilizers include the antioxidant type and generally consist of stericly hindered phenols, or sulfur or phosphorous substituted phenols. An especially useful antioxidant is Irganox 1010 (from Ciba-Geigy, Hawthorne, N.Y.) which is a pentaerythritol tetrakis-3(3,5-di-tertiarybutyl-4-hydroxyphenyl)propionate. Other additives such as plasticizers (e.g., phenols and phthalate esters), UV light absorbers, colorants, tackifiers and fillers can be present in small amounts as needed and as known in the adhesive art.

EXPERIMENTAL

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at room temperature, and pressure is at or near atmospheric.

In the following examples GEL Permeation Chromatography (GPC) is used for determination of the molecular weight distribution averages: Mw, Mn, Mw/Mn (polydispersity), and Mz. Approximately 60 milligrams of sample is weighed and dissolved in 20 ml. of tetrahydrofuran (THF) containing toluene (internal std.) at a level of 0.3% (v/v). The sample is filtered (if necessary) and then run on the GPC system. The data system generates a report showing: (1×) the molecular weight distribution averages, (2×) a time slice report, and (3×) standard, purchased from Polymer Laboratories, covering a molecular weight range of 580 to 1,030,000. The mode of calibration is "Narrow MW Standard Peak Positions".

EXAMPLE 1

Preparation of Linear Water-Dispersible Polyester Composition I

A 500-mL, round bottom flask equipped with a ground-glass head, an agitator shaft, nitrogen inlet, and a sidearm was charged with 73.87 g (0.445 mol) of isophthalic acid, 14.74 g (0.055 mol) of 5-sodiosulfoisophthalic acid, 81 g (0.75 mol) of diethylene glycol, 0.19 grams of titanium tetraisopropoxide and 0.847 g (0.0055 mol) of sodium acetate tetrahydrate. The flask was immersed in a Belmont bath at 200° C. for two hours under a nitrogen sweep. Heating was stopped and the copolyester was removed from the flask. The polymer had an inherent viscosity of 0.45 dL/g according to ASTM D3835-79 and a glass transition temperature of 29° C. as measured by differential scanning colorimetry (DSC) analysis. The polymer, which was transparent and amorphous, was extruded and pelletized. The polymer had a weight average molecular weight (Mw) of 8,924 and a number average molecular weight (Mn) of 5,422 by GPC using a polystyrene standard.

EXAMPLE 2

Preparation of Branched Water-Dispersible Polyester Composition II

To a three-neck round-bottom flask equipped with a mechanical stirrer, a stream partial condenser a Dean-Stark trap, and a water condenser were charged the following reactants: neopentyl glycol (363.38 g, 3.49 m), 5-sodiosulfoisophthalic acid (29.30 g, 0.109 m) and the catalyst, Fascat 4100 (Atochem North America, Inc.) (0.56 g). The mixture was heated to 150° C. and stirred under $N_2$ atmosphere and the temperature then gradually increased to 220° C. and the distillate (water) was collected in the Dean-Stark trap until the mixture was clear (about 1 hr). The acid number was determined to be close to zero, and the mixture was cooled to 150° C. The second stage reactants, trimethylolpropane (75.4 g, 0.563 m), isophthalic acid (329.01 g, 1.98 m) and adipic acid (202.25 g, 1.38 m) were then added. The temperature was gradually raised to 220° C. and the reaction continued for four more hours to yield a resin with an acid number of 3.6. The polymer had a weight average molecular weight (Mw) of 6,241, a number average molecular weight (Mn) of 1,740 and a polydispersity index of 3.6, determined by GPC using a polystyrene standard.

EXAMPLE 3

Preparation of a Water-Dispersible Hot-Melt Adhesive

A blend of the linear water-dispersible polyester polymer I prepared as in Example 1 (70 parts) by weight and the branched water-dispersible polyester polymer It of Example 2 (30 parts) by weight was prepared by combining the two polymers and stirring at about 225° C. for 2 hours to produce the adhesive composition. The composition had a Tg of about 11° C., a weight average molecular weight of 5,410, a number average molecular weight of 1,554, and a viscosity of 19,450 centipoise at 350° F. (175° C.) as determined on a Brookfield HV: II Viscometer. The adhesive had a fast set time, as determined by a standard procedure (TAPPI Symposium, Recyclable/Repulpable Hot Melts —A Summary —U.S.A. and Europe, June, 1990, by Michael J. Ambrosini) on a corrugated kraftboard substrate, good lap sheer strength (ASTM D1002 Test Method) and good tensile strength (ASTM 412 Test Method). Into 100 ml of hot water (65–80° C.) at a pH of 7.8, were mixed 0.5 grams of adhesive chips. Within 15 minutes under mild agitation the adhesive was completely dispersed in the water, forming a milky mixture.

EXAMPLE 4

An adhesive composition was prepared by blending 60 parts by weight of the linear water-dispersible polymer prepared as in Example 1 with 40 parts by weight of the branched water-dispersible polyester of Example 2 and the properties of the polymer and the polymer and adhesive properties determined as in Example 3 above. The adhesive chips were dispersed in hot water as in Example 3 within 15 minutes. The adhesive had good repulping properties, a Tg of about 8.4° C., a weight average molecular weight of 5,272, a number average molecular weight of 1,563 and a viscosity of 17,400 centipoise at 350° F. (175° C.).

EXAMPLE 5

An adhesive composition was prepared by blending 40 parts by weight of the linear water-dispersible polymer prepared as in Example 1 with 60 parts by weight of the branched water-dispersible polyester of Example 2 and the properties of the adhesive composition determined as in Example 3. The adhesive chips were dispersed in hot water as in Example 3 within 15 minutes. The adhesive had good repulping properties, a Tg of 4.2° C., a weight average molecular weight of 7,622, a number average molecular weight of 1,715 and a viscosity of 2,500 centipoise at 350° F. (175° C.).

EXAMPLE 6

An adhesive composition was prepared by blending 30 parts by weight of the linear water-dispersible polyester prepared as in Example 1 with 70 parts by weight of the branched water-dispersible polyester of Example 2 and the properties of the adhesive composition determined as in Example 3. The adhesive chips were attempted to be dispersed in hot water as in Example 3, however, only partial dispersion occurred. The adhesive had marginal repulping properties, a Tg of 4.4° C., a weight average molecular weight of 7,316, a number average molecular weight of 1,831 and a viscosity of 2,490 centipoise at 350° F.

EXAMPLE 7

Cut 0.9 to 1.7 grams of a branched sulfopolyester having an inherent viscosity of 0.6 and a Brookfield Thermosel molten viscosity@177° C. of around 350,000–550,000 cps@177° C. Dip coated each particle of polyester into a molten bath of 1,4,-Cyclohexane dimethanol dibenzoate. Approximate addition of dibenzoate to the branched sulfopolyester was 1.1 to 1.7 weight percent. The above particles were then placed in a 3-inch wide corrugated tube with a tin plate placed on top of the material with a 500-gram weight. The test assembles was then placed in a 105–110 F forced air oven for 9 days. After nine days the coated polyester particles were immediately examined after removal from the oven for free flowing non-tacky appearance. The particles tested in this experiment appeared to be free flowing.

EXAMPLE 8

The branched sulfopolyester of example 2 with an inherent viscosity of 0.40 dL/g was coated with approximately 1.1 to 1.7% of 1,4-cyclohexanedimethanol dibenzoate. This coated sulfopolyester was then compounded into a hot melt adhesive, along with conventional additives such as an aromatic hydrocarbon tackifier and additional 1,4-cyclohexane dimethanol as a set time modifier, along with conventional antioxidant stabilizers. The contents of the material, and the physical properties of the material, are reported in Table 1.

TABLE 1

| Component | Wt. Percent (of total composition weight) | Component Supplier |
| --- | --- | --- |
| The branched sulfopolyester of example 2 coated with 1.1 to 1.7% CHDM Dibenzoate | 70 | Eastman Chemical Company |
| Nevex 100 (an aromatic | 20 | Neville Chemical |

TABLE 1-continued

| Component | Wt. Percent (of total composition weight) | Component Supplier |
|---|---|---|
| modified hydrocarbon resin) | | |
| Irganox 1010 (a hindered phenol antioxidant) | 0.3 | Ciba-Geigy |

PHYSICAL TESTING:

| | |
|---|---|
| Viscosity @ 177° C. | 18,450 cp |
| RBSP C (ASTME-28) | 102 |
| Water Dispersibility | 100%, within 4 hrs @ RT, 1 gm of hot melt to 100 ml of water. |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A coated substrate comprising a coating and a substrate, wherein:
   a. the coating comprises a dibenzoate ester compound;
   b. the substrate comprises a sulfopolyester,
   c. the sulfopolyester comprises about 20 to 80 weight percent of linear water-dispersible polyester of (I) and about 20 to 80 weight percent of branched waterdispersible polyester of (II);
   d. the linear water-dispersible polyester of (I) is made of the residues or moieties of the following reaction products:
      i. at least one difunctional dicarboxylic acid which is not a sulfomonomer;
      ii. about 4 to 25 mol percent, based on the total of all acid, hydroxyl and amino equivalence, of residues of at least one difunctional sulfomonomer containing at least one sulfonate group bonded to an aromatic ring wherein the functional groups are hydroxyl, carboxyl, or amino;
      iii. at least one diol or a mixture of a diol and a diamine comprising:
         (1) at least 15 mol percent, based on the total mol percent of diol moieties or diol and diamine moieties, of a diol or diamine having the formula $H(-OCH_2CH_2-)_nOH$ and $HRN-(O-CH_2CH_2-O)_n-NHR$, wherein n is 2 to about 20 and R is hydrogen or $C_1-C_6$ alkyl, or
         (2) about 0.1 to less than about 15 mol percent, based on the total mol percent of diol moieties or diol and diamine moieties, of moieties of a poly (ethylene glycol) having the formula $H(-OCH2CH2-)_nOH$ wherein n is 2 to about 500;
   e. the linear water-dispersible polyester of (I) contains substantially equal mol proportions of acid equivalents (100 mol %) and diol or diol and diamine equivalents (100 mol %);
   f. in the linear water-dispersible polyester of (I), at least 20 weight percent of the groups linking the moieties of the monomeric units are ester linkages;
   g. the inherent viscosity of the linear water-dispersible polyester of (I) is at least 0.1 dL/g measured in a 60/40 pails by weight solution of phenol/tetrachloroethane at 25° C. and at a concentration of about 0.25 g of polymer in 100 ml of the solvent;
   h. the polyester of (II) is a branched sulfopolyester that contains at least three functional groups selected from hydroxyl, carboxyl, and amino.

2. The coated substrate according to claim 1, wherein the coating has a glass transition temperature of above 23° C.

3. The coated substrate according to claim 1, wherein the coating has a glass transition temperature of above 60° C.

4. The coated substrate according to claim 1, wherein the coating has a ring softening point of from about 80 to about 140° C.

5. The coated substrate according to claim 1, wherein the coating is 1,4- or 1,3-cyclohexanedimethanol dibenzoate.

6. The coated substrate according to claim 1, wherein 0.5 grams or greater of the coated substrate are soluble or dispersible in 100 ml. of water at room temperature and a neutral pH.

* * * * *